United States Patent [19]

Poirier et al.

[11] Patent Number: 5,618,408
[45] Date of Patent: Apr. 8, 1997

[54] METHOD FOR REDUCING ELEMENTAL SULFUR PICK-UP BY HYDROCARBON FLUIDS IN A PIPELINE (LAW177)

[75] Inventors: Marc-Andre Poirier, Sarnia; Robert J. Falkiner, Mississauga, both of Canada

[73] Assignee: Exxon Research and Engineering Company, Florham Park, N.J.

[21] Appl. No.: 320,024

[22] Filed: Oct. 7, 1994

[51] Int. Cl.$^6$ .................................................. C10G 45/00
[52] U.S. Cl. ........................... 208/370; 208/98 R; 137/13
[58] Field of Search ................................ 208/370, 48 R; 137/13

[56] References Cited

U.S. PATENT DOCUMENTS

| | | | |
|---|---|---|---|
| 2,051,814 | 8/1936 | Benedict | 208/370 |
| 2,119,240 | 3/1938 | Lyons | 208/370 |
| 2,231,160 | 2/1941 | Harlow | 208/370 |
| 2,284,809 | 6/1942 | Dryer | 208/370 |
| 2,385,175 | 9/1945 | Wachter | 208/370 |
| 2,981,683 | 4/1961 | Simpson | 208/370 |
| 3,269,401 | 8/1966 | Scotteld | 208/370 |
| 3,776,248 | 12/1973 | Titus | 208/370 |
| 3,887,330 | 6/1975 | Horratch | 208/370 |
| 4,011,882 | 3/1977 | Nivens et al. | |
| 5,223,160 | 6/1993 | Emmons | 252/8.552 |

OTHER PUBLICATIONS

"Adsorption of $N_2$, $O_2$, $CO_2$ and $H_2$ on Hydrotalcite–like System": $Mg^{2+}$–$Al^{3+}$–$(Fe(CN)6)^{4-}$, Miyata et al, Clays and Clay Minerals, vol. 26 No. 6, pp. 441–447 (1978).

Primary Examiner—Helane Myers
Attorney, Agent, or Firm—Joseph J. Allocca

[57] ABSTRACT

The amount of elemental sulfur or other sulfur contaminant picked-up by refined hydrocarbon product such as gasoline, diesel, jet fuel, kerosene or fuel additive such as ether, which is pipelined in a pipeline used to transport sour hydrocarbon fluids, is reduced by controlling the level of dissolved oxygen in the refinery hydrocarbon product to which is to be pipelined, said dissolved oxygen level being held to a level of about 30 wppm and less, preferably about 20 wppm and less. The dissolved oxygen level in the refined hydrocarbon product is controlled by reducing the amount fair injection employed in mercaptan or disulfide reduction production increases or by the use of oxygen scavengers prior to the introduction of the refined hydrocarbon product into the pipeline, or by limiting the exposure of the product to air in oxygen during transport or storage.

4 Claims, 1 Drawing Sheet

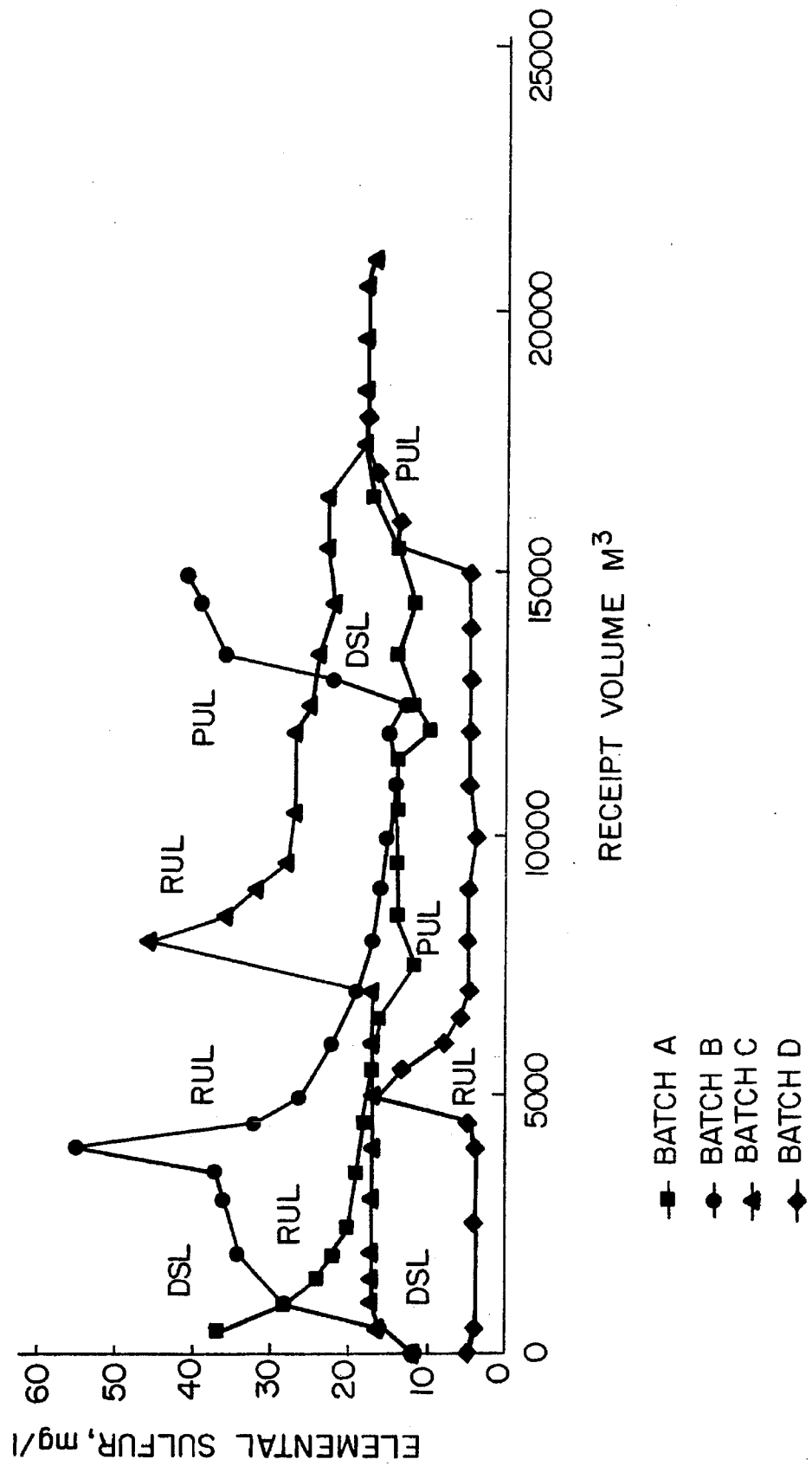

METHOD FOR REDUCING ELEMENTAL SULFUR PICK-UP BY HYDROCARBON FLUIDS IN A PIPELINE (LAW177)

FIELD OF THE INVENTION

This invention relates to the transportation of hydrocarbon fluids through pipelines. It particularly relates to a method for transporting refined hydrocarbon fluids such as gasoline, diesel fuel through a crude pipeline. The invention further related to a method for reducing elemental sulfur and other sulfur contaminants picked-up in a crude pipeline by reducing the dissolved oxygen content in the said refined hydrocarbon fluids.

BACKGROUND OF THE INVENTION

It has not been considered feasible in the past to transport refined hydrocarbon fluids in a pipeline used for the transportation of sour hydrocarbon fluids such as crude oil. The major difficulty is that refined hydrocarbon fluids such as gasoline and diesel fuel pick-up contaminants such as elemental sulfur. Between about 10 to 80 mg/L elemental sulfur is picked up by pipelined gasoline and between about 2 to 20 mg/L elemental sulfur is picked up by diesel. The copper strip corrosion by ASTM D-130 of these fuels is 4a/4b. Elemental sulfur has particularly corrosive effect on equipment such as brass valves, gauges, silver bearings cage in two-cycle engine and in-tank fuel pump copper commutators. Addition of copper corrosion inhibitor is used to meet ASTM D-130 copper strip ratings of 1a/1b but does not provide sufficient good corrosion protection in all types of equipment.

While numerous factors such as aromatics content, pipeline temperature, batch size, batch sequencing, line outage, pigging, etc. have been found to affect the elemental sulfur pick-up in the pipeline. No correlation of these variables with the actual level of elemental sulfur pick-up by the fuel has been found. Regardless, however, most of these factors are not controllable anyway.

As a result, few patents have appeared in the patent literature dealing with transportation of hydrocarbons in pipelines used for sour hydrocarbon fluids.

U.S. Pat. No. 4,071,882 described a method for minimizing sulfur contamination of refined hydrocarbon fluids transported in a pipeline for the transportation of sweet and sour hydrocarbon fluids by a) mixing with the sour hydrocarbon fluids from 0 to about 2000 ppm of a corrosion inhibiting additive; b) transporting the sour hydrocarbon through the pipeline; c) transporting a sweet hydrocarbon wash solution containing from about 10 to about 2000 ppm of a mixture of light amines and heavy amines, up to about 2000 ppm of a corrosion inhibiting additive, up to about 500 ppm of a surfactant and up to about 1500 ppm of an alkanol containing from 1 to about 6 carbon atoms; and d) transporting refined hydrocarbon fluids containing up to about 200 ppm of a corrosion inhibiting additive, an amine having a molecular weight from about 31 to about 500 or mixtures thereof.

BRIEF DESCRIPTION OF THE FIGURE

FIG. 1 shows the relationship which exists between the dissolved $O_2$ content of a series of gasoline feed batches and the amount of elemental sulfur picked up by each fuel component in the batches as they pass through a delivery pipeline. The figure shows the upward or downward trend in elemental sulfur pick-up for each fuel component of different dissolved $O_2$ content (regular unleaded, premium unleaded, diesel) in 4 batches.

THE PRESENT INVENTION

The present invention comprises a method for reducing the amount of elemental sulfur and other sulfur contaminants picked up by refined hydrocarbon fluids transported in a pipeline also used for the transportation of sour hydrocarbon fluids said elemental sulfur and other sulfur contaminant pick up reduction being effected by reducing and controlling the levels of dissolved oxygen in the refined hydrocarbon fluids before it is introduced into the pipeline for transport. This can be achieved by reducing oxygen (air) injection in Merox units used to oxidize mercaptans to disulfides in various hydrocarbon fluids used in gasoline blending or in the gasoline pool. The reduction of dissolved oxygen in the various hydrocarbon fluid streams such as Light Cat Naphtha, Reformate, Motor Alkylate, Heavy Cat Naphtha, Light Vacuum Naphtha and the like and finished products such as gasoline and diesel fuel can be achieved also by the use of oxygen scavengers such as sodium sulfite, hydrazines and other known oxygen scavengers as well as by reducing the degree of exposure of such fluids to air or oxygen.

The amount of dissolved oxygen present in the refined hydrocarbon fluid product being pipeline transported is held or reduced to about 30 wppm dissolved $O_2$ and less, preferably about 20 wppm dissolved $O_2$ and less, more preferably about 10 wppm dissolved $O_2$ and less. Holding or reducing the dissolved $O_2$ content of the refined hydrocarbon product to be pipelined to these levels at the time the fluid is introduced into the pipeline for transport results in a reduction in elemental sulfur pick-up in pipelined product from 30–50 mg/L as has been typical in pipelined product to 3 to 15 mg/L. Prior to pipelining the refined hydrocarbon product has an elemental sulfur content of 0 mg/L.

The refined hydrocarbon fluids can be washed with solution of e.g. sodium sulfite or the latter can be used as an adsorbent bed. Clay materials such as hydrotalcites have also been used (Clays and Clay Minerals V26, 6, 441, 1978) for the adsorption of oxygen. The refined hydrocarbon fluids can be treated with various hydrazine compounds, which are known to react with molecular oxygen in aqueous solutions, and have been demonstrated to react similarly in hydrocarbons. The sour hydrocarbon fluids referred in this invention are fluids such as crude oils, sour distillates, sour condensates and the like which contain substantial amounts of sulfur and sulfur compounds such as elemental sulfur, hydrogen sulfide, mercaptans, polysulfides and the like. Such sulfur compounds are corrosive and undesirable in refined hydrocarbon fluids.

The mechanism of elemental sulfur pick-up by the refined hydrocarbon fluids in the pipeline is not known. However, it is believed the elemental sulfur is transferred to the refined product from the sour hydrocarbons adhering at the pipeline wall via reactions at the pipeline wall.

Dissolved oxygen is picked up by refined hydrocarbon fluids by air injection into light cat naphtha (LCN) during Merox treatment, by passage through pumps, or at air/fluid interface spaces in tankage during storage of the hydrocarbon fluids. Thus, reducing the amount of air or oxygen injection used in treatment processes or by blanketing storage tanks in nitrogen or other inert gas which doesn't contain oxygen or act as a source of oxygen or by reducing the air/hydrocarbon surface area interface is an effective way of reducing or controlling the dissolved oxygen content in the refined hydrocarbon product to a level of about 30 wppm or less, preferably about 20 wppm or less, more preferably about 10 wppm or less.

Addition of mercaptan and antioxidant (PDA) can be used in various combinations for minimizing oxygen uptake during processing and storage. The desired mercaptan/oxygen reduction in one of the gasoline blend components (LCN) can be achieved by operating the Merox type process units in a suboptimal manner. The Mercaptan Oxidation (Merox trade name) process involves the catalytic oxidation of mercaptans to the corresponding disulfides using an aqueous caustic solution of a chelated cobalt ion metal catalyst. Air is normally injected upstream of the reactor at a rate of 2–4 times that calculated to be necessary to oxidize all of the mercaptans in the feed (2–4 "theories" of air). Excess air injection results in significant levels of dissolved oxygen in the treated product, and a lower mercaptan level from more complete reaction, which is a desired result for mercaptan treating but not pipeline operations. Normal and recommended operation results in significant levels of dissolved oxygen in the product. In addition, day-to-day variability in refinery crude selection and mercaptan sulfur levels in the Merox feed, combined with day-to-day variation process conditions combine to make this one of the two main sources of variability in dissolved oxygen content in the final blended gasoline.

EXAMPLE 1

The Refinery gasoline supply system consists of two shipping tanks that deliver product to the mainline product pumping station. One Tank (Tank I) is the normal shipping tank for Regular Unleaded gasoline (RUL) and another Tank (Tank II) is the normal shipping tank for Premium Unleaded gasoline (PUL). A third Tank (Tank III) not normally used as a shipping tank for this pipeline system, was used in several RUL test shipments when pipeline schedules allowed. The mechanical design of this third tank allowed the gasoline to be maintained at a lower oxygen content while waiting for shipment.

The first two tanks are both closed top tanks equipped with internal support columns for the roof and "Mayflower" design aluminum pontoon type floating pans to minimize hydrocarbon vapor releases. This pan design is effective at reducing hydrocarbon emissions, but it does not provide a barrier to air/oxygen uptake. The gasoline surface is exposed to air in the area between the pontoons, and around the cutouts in the pan for the internal roof support columns. Gasoline stored in this design of tank becomes fully air saturated in 2–4 days, which is much shorter than the nominal 6–10 days between shipments. In addition, the "heel" or unavailable volume left in the tank after a shipment becomes fully air saturated between successive blends and shipments, so it is not possible to maintain low dissolved $O_2$ levels with normal operations in Mayflower design tanks.

The third tank has a free standing geodesic dome roof (no internal roof support pillars) and a steel pan that floats on the product. This pan design does not have an air space between the pan and the product, or cutouts for roof support columns. In addition to minimizing hydrocarbon emissions, it is a much more effective barrier to air/oxygen diffusion into gasoline from the air space. The only contact area for gas absorption is the small annular space between the pan rim and the tank sidewall around the circumference of the tank. This air exposure area is very small compared to the air exposure area of a Mayflower design. Gasoline stored in this style of tank does not become air saturated in the 6–10 day storage between shipments. The "heel" remains at a low oxygen content between the time of shipment, and the time that the tank is re-filled in preparation for the next shipment, so product can be maintained at relatively low air saturation levels during normal operations.

It is possible to obtain a "medium" dissolved $O_2$ level using a Mayflower design tank, if the tank is filled with product immediately before shipment. This eliminates the dissolved $O_2$ increase that would have occurred on standing, but does not eliminate the dissolved $O_2$ that originates from the air saturated "heel" which was present in the tank when the tank is re-filled.

By varying the tank used, and incorporating the fast fill/ship strategy, it was possible to test high, medium and low concentrations of dissolved oxygen in the RUL, and monitor the results in the pipeline and on receipt at the terminal.

This example shows that reducing the dissolved oxygen in the shipping tank (see data Tank III) gave significant lower elemental sulfur in the product after pipelining.

| Batch | Tank Number | Pre-Pipeline | | Post-Pipeline | | Comments |
|---|---|---|---|---|---|---|
| | | Mogas Grade | Oxygen In wppm | Oxygen Out wppb | $S°$, mg/L | |
| A | TANK I | RUL | 24 | — | 33 | |
| A | TANK II | PUL | 22 | — | 28 | |
| B | TANK I | RUL | 51 | — | 32 | |
| B | TANK II | PUL | 60 | — | 22 | |
| C | TANK I | RUL | 43 | — | 45 | |
| C | TANK II | PUL | 50 | — | 36 | |
| D | TANK III | RUL | 10 | 6 | 18 | low $O_2$ |
| D | TANK II | PUL | 40 | 5 | 21 | |
| E | TANK III | RUL | 15 | — | 19 | low $O_2$ |
| E | TANK II | PUL | 45 | — | 34 | |
| F | TANK I | RUL | 24 | — | 27 | |
| F | TANK II | PUL | 19 | — | 18 | low $O_2$ |
| G | TANK I + PDA | RUL | 36 | 2000 | 27 | |
| G | TANK II + PDA | PUL | 31 | 2100 | 18 | |
| H | TANK I + PDS + RSH | RUL | 46 | — | 40 | |
| H | TANK II + PDA + RSH | PUL | 39 | — | 29 | |
| I | TANK I + PDA + RSH | RUL | 27 | — | 28 | |
| I | TANK II + PDA + RSH | PUL | 29 | — | 23 | |
| J | TANK I + PDA + RSH | RUL | 29 | — | 28 | |
| J | TANK II + PDA + RSH | PUL | 29 | — | 29 | |
| K | TANK I | RUL | 33 | — | 29 | |

-continued

| | | Pre-Pipeline | | Post-Pipeline | | |
|---|---|---|---|---|---|---|
| Batch | Tank Number | Mogas Grade | Oxygen In wppm | Oxygen Out wppb | S°, mg/L | Comments |
| K | TANK II | PUL | 47 | — | 27 | |
| L | TANK III + PDA + RSH | RUL | 5 | 24 | 7 | low O$_2$ |
| L | TANK II + PDA + RSH | PUL | 23 | 26 | 17 | |

Batch F was the first test of rapid blend/ship procedure on Mayflower equipped shipping tanks, and was only moderately successful with moderate oxygen reduction.

It is interesting to note that the dissolved oxygen in the pre-pipelined product went from 10–40 wppm to 5–2100 wppb in the post-pipelined product.

EXAMPLE 2

The results on four test batches to date in particular highlight the oxygen effects in the pipeline. This is illustrated in FIG. 1.

Batch A—First run of regular unleaded (RUL) through no air space contact floating pan shipping tank, low O$_2$ level; followed by high O$_2$ premium unleaded (PUL) and high O$_2$ diesel. Note that this batch sequence followed a sequence of crude, diesel and another batch of motor gasoline (MG) of uncontrolled/unmeasured dissolved O$_2$ content in the pipeline.
←Crude/Dsl/MG/RUL/PUL/Dsl/Crude Batch B—Second run of RUL through no air space contact floating pan storage tank, with low dissolved O$_2$ content in the RUL. Followed by high O$_2$ PUL in a "regular" product sequence.
←Crude/Syncrude/Dsl/RUL/PUL/Crude Batch C—First test of heel flush procedure on Mayflower equipped tanks (floating roof with air space) only moderately successful with moderate O$_2$ reduction. Repeat of Batch B sequence with only difference being the PUL was lower O$_2$ level than the RUL.

Batch D—Third test of RUL through no air space contact floating pan shipping tank, lowest oxygen content yet achieved. Followed by high O$_2$ PUL in a "regular" product sequence. Same sequence as batch B, but a still lower RUL O$_2$, and roughly comparable PUL O$_2$ level.

| Batch | Grade(1) | O$_2$ in wppm | O$_2$ Out wppb | S° mg/L | Comments |
|---|---|---|---|---|---|
| A | RUL | 12 | 6 | 20 | Sulfur trend down |
| | PUL | 40+ | 5 | 34 | Sulfur trend up |
| | DSL | 40+ | — | 27 | Sulfur trend up |
| B | DSL | 40+ | — | 27 | Sulfur trend up |
| | RUL | 15 | — | 20 | Sulfur trend down |
| | PUL | 40+ | — | 34 | Sulfur trend up |
| C | DSL | 40+ | — | 19 | Sulfur trend flat |
| | RUL | 25 | 2000 | 27 | Heel flush - sulfur trend down |
| | PUL | 19 | 2100 | 18 | Heel flush - sulfur trend down |
| D | DSL | 2 | 1460 | 5 | Sulfur trend flat to slight increase |
| | RUL | 5 | 24 | 7 | Sulfur trend flat at very low levels |
| | PUL | 23 | 26 | 17 | Sulfur trend increasing |

(1) RUL = regular unleaded gasoline, PUL = premium unleaded gasoline, DSL = diesel.

Batch C, the third pipeline test batch was a "repeat" of the previous batch B, with diesel leading RUL and PUL. However, this batch was prepared to minimize dissolved oxygen in both RUL and PUL, as compared to having a low oxygen RUL and high oxygen PUL in the previous batch B. This was achieved by shipping the product as soon as possible as the blend was made into Mayflower tank (Tank I and II respectively), which resulted in a "medium" oxygen content of both RUL and PUL at approximately 25 ppm and 19 ppm respectively (heel flush). This compares to historical highs in the 40–60 ppm range (saturation) and low of 12 and 15 ppm on RUL when using contact pan shipping tankage in batches A and B.

The previous batch B with low oxygen RUL and high oxygen PUL resulted in a very low contaminated RUL, with elemental sulfur level decreasing through the batch followed by a very high sulfur contaminated PUL (high O$_2$ content in PUL) with sulfur level increasing in the batch during passage of the batch. This batch C with a moderate level oxygen RUL/PUL (25/19 respectively) resulted in a more typical RUL/PUL receipt, with sulfur decreasing both through the RUL and PUL batch, with a break point downward going into the PUL. These dramatic differences strongly confirm that dissolved oxygen in products is a controlling factor in achieving low sulfur contaminated batches.

Batch D shows that very little (if any) flushing volume in the pipeline is actually necessary at all. From the figure it is seen that the RUL has come into equilibrium with the pipeline at low elemental sulfur levels within 2 MM$^3$ into a 9 MM$^3$ gasoline batch. In addition, the profile of elemental sulfur through the batch is flat, after a very small spike of elemental sulfur at the front end of the batch. There is no evidence that any decrease in elemental sulfur from front to back would be expected from a best blend/ship-process.

For Batch D, the sulfur and oxygen were measured on leaving the refinery and at 4 intermediate pumping stations, nominally 100 km, 230 km, 380 km, and 590 km and finally at the terminal (820 km). The sulfur and the oxygen profile in the RUL mogas started at 5 wppm O$_2$ and 0 mg/L elemental sulfur (refinery) and were 35 wppb O$_2$ and 5 mg/L elemental sulfur after traveling 100 km in the pipeline. The PUL mogas which started at 23 wppm O$_2$ and 0 mg/L elemental sulfur had 250 wppb O$_2$ and 17 mg/L elemental sulfur at the same distance.

The sulfur and oxygen profile is flat throughout until received at the final destination (820 km) because the gasoline became depleted in dissolved oxygen reactant.

At higher oxygen contents, the profile of sulfur contamination tends to decrease from front to back of each batch of a given dissolved O$_2$ content level. This behavior would be expected, as the equilibrium is shifted more toward the center. The product can now have a greater influence on the chemical oxidation state of the pipeline wall as it travels down the pipe, and the head of the batch would tend to see more severe set of chemical conditions than the back of the batch. There is no direct correlation of dissolved O$_2$ with elemental sulfur at a given point in the batch as product has reached an equilibrium ($O_2$ in ppb range and elemental sulfur pick-up levels has been achieved). Average $O_2$ and elemental sulfur of the whole batch, pre-pipeline/post-pipeline give a better and more realistic picture showing that reducing $O_2$ content affects elemental sulfur pick-up. See FIG. 1 where elemental sulfur pick up shows upward or downward trends in the course of progress of any given gasoline component (RUL or PUL) in the batch of gasoline.

EXAMPLE 4

This example shows that hydrazine and alkylhydrazines reduces dissolved oxygen in the fuel but do not have significant effect in reducing elemental sulfur.

A gasoline sample containing 32 mg/L elemental sulfur and 64 wppm dissolved oxygen was stirred at room temperature for 20 hours with the following hydrazines.

|  | $O_2$ wppm | $S°$,mg/L |
|---|---|---|
| Feed | 64 | 32 |
| Feed + 64 mg/L hydrazine | 26 | 31 |
| Feed + 120 mg/L, 1,1-dimethylhydrazine | 27 | 31 |
| Feed + 184 mg/L diphenylhydrazine | 18 | 31 |

This indicates that the feed must be prevented from picking up elemental sulfur in the first place and that chemicals useful in reducing dissolved $O_2$ content levels will not reduce the elemental sulfur content already present in a fuel batch.

What is claimed is:

1. A method for reducing the amount of elemental sulfur and other sulfur contaminants picked up by refined hydrocarbons fluids while being transported in a pipeline also used for the transportation of sour hydrocarbon fluids which contain elemental sulfur and other sulfur contaminants and leave such elemental sulfur and other sulfur contaminants in the pipeline as a residue after their passage therethrough, such method comprising controlling the dissolved oxygen content in the refined hydrocarbon fluid so that that fluid contains about 30 wppm dissolved oxygen or less before it is introduced into the pipeline for transport.

2. The method of claim 1 wherein the amount of dissolved oxygen is controlled so as to be about 20 wppm dissolved oxygen or less.

3. The method of claim 1 wherein the dissolved oxygen content of the refined hydrocarbon fluid is controlled by minimizing the degree of exposure of the fluid to air or oxygen.

4. The method of claim 1 wherein the dissolved oxygen content of the refined hydrocarbon fluid is controlled by use of an oxygen scavenger.

* * * * *